US010872383B2

(12) United States Patent
Dey et al.

(10) Patent No.: US 10,872,383 B2
(45) Date of Patent: Dec. 22, 2020

(54) USING A MODEL TO ESTIMATE A PAYMENT DELINQUENCY FOR AN INVOICE

(71) Applicant: Oracle International Corporation, Redwood Shores, CA (US)

(72) Inventors: Tapomoy Dey, Santa Clara, CA (US); Aaron P. Thomas, San Francisco, CA (US)

(73) Assignee: Oracle International Corporation, Redwood Shores (CA)

( * ) Notice: Subject to any disclaimer, the term of this patent is extended or adjusted under 35 U.S.C. 154(b) by 349 days.

(21) Appl. No.: 15/893,446

(22) Filed: Feb. 9, 2018

(65) Prior Publication Data

US 2018/0232814 A1  Aug. 16, 2018

Related U.S. Application Data

(60) Provisional application No. 62/458,638, filed on Feb. 14, 2017, provisional application No. 62/468,199, filed on Mar. 7, 2017.

(51) Int. Cl.
*G06Q 40/00* (2012.01)
*G06Q 10/06* (2012.01)

(52) U.S. Cl.
CPC .......... *G06Q 40/12* (2013.12); *G06Q 10/067* (2013.01); *G06Q 40/10* (2013.01)

(58) Field of Classification Search
CPC ....... G06Q 40/12; G06Q 40/10; G06Q 10/067
USPC .................................................. 705/34, 30
See application file for complete search history.

(56) References Cited

U.S. PATENT DOCUMENTS

| 9,443,268 B1* | 9/2016 | Kapczynski | G06Q 40/025 |
|---|---|---|---|
| 10,223,745 B1* | 3/2019 | Randhawa | G06Q 40/025 |
| 2005/0130704 A1* | 6/2005 | McParland | G06Q 40/02 |
| | | | 455/556.2 |
| 2014/0074591 A1* | 3/2014 | Allen | G06Q 30/0244 |
| | | | 705/14.43 |
| 2018/0012143 A1* | 1/2018 | Hansen | G06Q 10/00 |
| 2018/0012232 A1* | 1/2018 | Sehrawat | H04L 51/32 |

* cited by examiner

*Primary Examiner* — Florian M Zeender
*Assistant Examiner* — Christopher R Buchanan
(74) *Attorney, Agent, or Firm* — Invoke

(57) ABSTRACT

Using a model to estimate a payment delinquency for an invoice is described. Multiple delinquency estimation models are generated based on a training set of invoices. Each delinquency estimation model estimates a respective payment delinquency for a particular invoice. A refined payment delinquency is determined for the particular invoice based on respective payment delinquencies determined by the delinquency estimation models. Information associated with a set of invoices may be presented at an interface based on the respective payment delinquencies. A payment reminder application may be programmed to process the invoices according to payment reminder schedules determined based on the respective payment delinquencies. Additionally, invoices may be added to the training set of invoices to update the delinquency estimation models. Invoices that were processed according to a payment reminder schedule that was modified based on the respective payment delinquencies are not included in the training set of invoices.

21 Claims, 7 Drawing Sheets

Graph
400

USING A MODEL TO ESTIMATE A PAYMENT DELINQUENCY FOR AN INVOICE

BENEFIT CLAIMS; INCORPORATION BY REFERENCE

This application claims the benefit of U.S. Provisional Patent Application No. 62/458,638, filed Feb. 14, 2017; and U.S. Provisional Patent Application No. 62/468,199, filed Mar. 7, 2017; each of which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to predicting payment behavior associated with invoices. In particular, the present disclosure relates to using a model to estimate a payment delinquency for an invoice.

BACKGROUND

An invoice database maintains information on each invoice that is issued and the payments that have been received. When a due date for an invoice has passed but payment has still not been received, a collections process is triggered. The invoice database may present delinquent invoices on a user interface for review by a collections department of company. The collections department may take various collections actions to request payment from the customer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
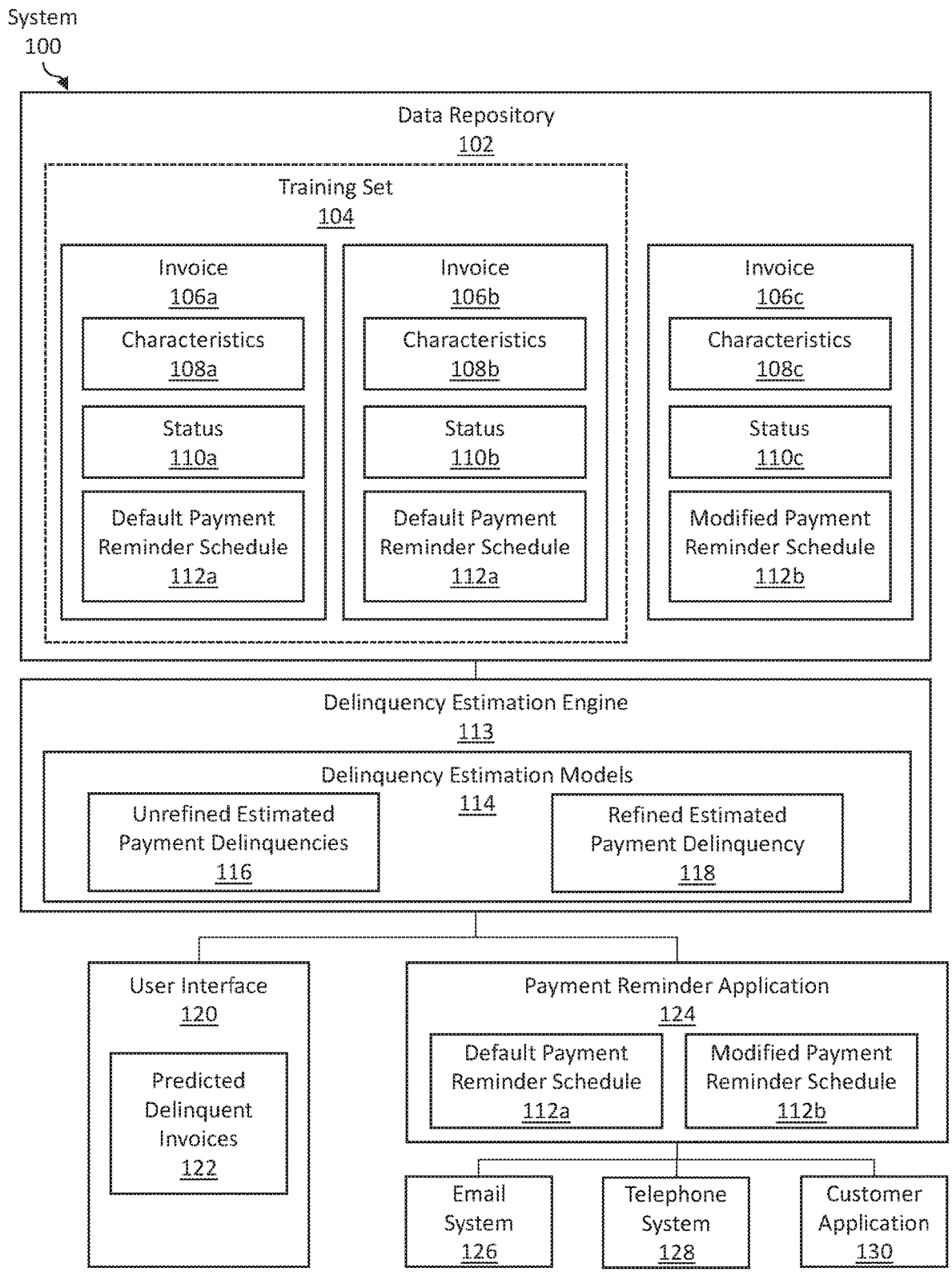
FIG. 1 illustrates a delinquency estimation system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DELINQUENCY ESTIMATION SYSTEM ARCHITECTURE
3. USING A MODEL TO ESTIMATE A PAYMENT DELINQUENCY FOR AN INVOICE
4. EXAMPLE EMBODIMENTS
5. HARDWARE OVERVIEW
6. MISCELLANEOUS; EXTENSIONS

1. General Overview

Some embodiments use a delinquency estimation model to estimate a payment delinquency for an invoice. A payment delinquency for an invoice corresponds to an amount of time that has elapsed subsequent to a due date for the invoice before payment is received. A delinquency estimation model may be, for example, a decision tree model. The delinquency estimation model includes a number of nodes, connected through various branches. Each node represents an inquiry regarding one or more attributes associated with an invoice. A result of an inquiry represented by a current node determines which branch, emanating from the current node, to follow to reach another node of the delinquency estimation model. The last node on a particular branch estimates a payment delinquency for the invoice.

Some embodiments use an ensemble of delinquency estimation models corresponding to respective subsets of a training data set. Each of the ensemble of delinquency estimation models estimates a respective payment delinquency for a particular invoice. A refined payment delinquency is determined for the particular invoice based on respective payment delinquencies determined by the ensemble of delinquency estimation models.

Some embodiments present estimated payment delinquencies for a set of invoices at a user interface. As an example, a user interface may display a set of outstanding invoices. The user interface may display flags corresponding to each outstanding invoice that is predicted to be delinquent. As another example, a user interface may display a graph associated with invoices that are predicted to be delinquent. A graph may include "age of invoice" as one dimension and "amount due on invoice" as another dimension. Each invoice that is predicted to be delinquent may be plotted on the graph. Another graph may be a bar chart. Each bar may indicate the number of invoices that are predicted to be delinquent for a respective customer.

Some embodiments use an estimated payment delinquency for programming a payment reminder application. A payment reminder application transmits reminders according to a payment reminder schedule. A payment reminder schedule indicates a set of collection actions and corresponding wait intervals. An estimated payment delinquency is used to determine the collection actions and/or the corresponding wait intervals for an invoice. In an embodiment, a payment reminder application processes invoices according to a default payment reminder schedule. However, a system may re-program the payment reminder application to process a particular invoice using a modified payment reminder schedule based on an estimated payment delinquency for the particular invoice.

Some embodiments update a current delinquency estimation model through multiple iterations of a machine learning process on successive sets of training data. Each new set of training data includes at least a subset of new invoices that were issued after the current delinquency estimation model was generated. In particular, the new invoices may include a particular set of invoices that were processed using modified payment reminder schedules. The new set of training data may exclude the particular set of invoices. Alternatively, the new set of training data may include the particular set of invoices and additionally include a new attribute indicating whether a payment reminder schedule was modified for each invoice in the training data.

One or more embodiments described in this Specification and/or recited in the claims may not be included in this General Overview section.

2. Delinquency Estimation System Architecture

FIG. 1 illustrates a delinquency estimation system, in accordance with one or more embodiments. As illustrated in FIG. 1, a system 100 includes a data repository 102, a delinquency estimation engine 113, a user interface 120, a payment reminder application 124, an email system 126, a telephone system 128, and a customer application 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a data repository 102 is any type of storage unit and/or device (e.g., a file system, database, collection of tables, or any other storage mechanism) for storing data. Further, a data repository 102 may include multiple different storage units and/or devices. The multiple different storage units and/or devices may or may not be of the same type or located at the same physical site. Further, a data repository 102 may be implemented or may execute on the same computing system as a delinquency estimation engine 113. Alternatively or additionally, a data repository 102 may be implemented or executed on a computing system separate from a delinquency estimation engine 113. A data repository 104 may be communicatively coupled to the delinquency estimation engine 113 via a direct connection or via a network.

Information describing invoices 106a-c may be implemented across any of components within the system 100. However, this information is illustrated within the data repository 102 for purposes of clarity and explanation.

In one or more embodiments, an invoice (such as invoices 106a-c) is a list of goods and/or services provided, with a statement of the monetary amount due for the goods and/or services.

An invoice is associated with one or more invoice characteristics (such as invoice characteristics 108a-c). Invoice characteristics include characteristics associated with the invoice itself. Invoice characteristics also include characteristics associated with the customer of the invoice, such as the customer's past payment behavior.

Examples of invoice characteristics include
(a) a customer associated with the invoice;
(b) a monetary amount due for the invoice;
(c) a number of days from the issuance of the invoice to the due date of the invoice;
(d) whether there is an early payment discount for early payment of the invoice;
(e) a percentage of the early payment discount;
(f) a number of days from the issuance of the invoice to the date on which the early payment discount remains applicable;
(g) a number of invoices paid by a particular customer;
(h) a sum of base amounts paid by the particular customer;
(i) a number of invoices paid late by the particular customer;
(j) a sum of base amounts paid late by the particular customer;
(k) an average number of days by which payments for invoices are late for the particular customer;
(l) a number of outstanding invoices for the particular customer;
(m) a sum of base amounts of outstanding invoices for the particular customer;
(n) a number of past-due outstanding invoices for the particular customer;
(o) a sum of base amounts of past-due outstanding invoices for the particular customer; and
(p) an average number of days by which payments for the past-due outstanding invoices are late for the particular customer.

An invoice is associated with a payment status (such as payment status 110a-c). A payment status indicates a status associated with the payment of the invoice. When an invoice is issued but not yet due, a status may be, for example, "Outstanding." When an invoice is past due, a status may be "Delinquent." When an invoice is paid on time, a status may be "Paid On Time." When an invoice is paid late, a status may be "Paid Late." A status may indicate a number of days that an invoice is past due. For example, an invoice that is ten days past due may be associated with a status, "Delinquent by Ten Days." An invoice that was paid ten days after due date may be associated with a status, "Paid Late by Ten Days."

An invoice is associated with a payment reminder schedule (such as default payment reminder schedule 112a or modified default payment schedule 112b). A payment reminder schedule indicates a set of collection actions and corresponding wait intervals. The wait intervals may begin to run with respect to the issuance date of the invoice, or the due date of the invoice, or the time at which an estimation of a payment delinquency is generated for an invoice. Examples of collection actions include: transmitting an automated email to a customer via an email system 126, making an automated telephone call to a customer via a telephone system 128, generating an alert to a customer via a customer application 130, and sending a collections agent to visit a customer.

A default payment reminder schedule 112a is a payment reminder schedule that applies to an invoice for which an estimated payment delinquency has not been determined. A default payment reminder schedule 112a may also apply to an invoice associated with an estimated payment delinquency that is below a threshold value.

A modified payment reminder schedule 112b is a payment reminder schedule that applies to an invoice associated with an estimated payment delinquency that is above a threshold value. A modified payment reminder schedule 112b may be a modified version of a default payment reminder schedule 112a. Additionally or alternatively, a modified payment reminder schedule 112b may indicate a set of collection actions and/or corresponding wait intervals that are determined based on an estimated payment delinquency. Different modified payment reminder schedules 112b may be applied to invoices that are associated with different estimated payment delinquencies. As an example, one modified payment reminder schedule may apply to invoices associated with estimated payment delinquencies between 0 and 3 days. A different modified payment reminder schedule may apply to invoices associated with estimated payment delinquencies between 4 and 7 days.

Different payment reminder schedules may be more effective at collecting payment for different invoices. A default reminder schedule may include more friendly collection actions than a modified reminder schedule. A default reminder schedule may include longer wait intervals than a modified reminder schedule. A default reminder schedule may be effective at collecting payments for invoices that are associated with a small estimated payment delinquency. A modified reminder schedule may be effective at collecting payments for invoices that are associated with a large estimated payment delinquency.

In one or more embodiments, a delinquency estimation engine 113 refers to hardware and/or software configured to perform operations described herein for using a model to estimate a payment delinquency for an invoice. A payment delinquency for an invoice corresponds to an amount of time that has elapsed subsequent to a due date for the invoice before payment is received.

As an example, a payment delinquency may indicate a number of days that elapse between the due date and receipt of payment. A payment delinquency of "1" or more indicates an invoice is past due, or paid after the due date. A payment delinquency for an invoice that is paid before the due date may be deemed as "0." Alternatively, the payment delinquency for an invoice that is paid before the due date may be a negative number. An invoice that is paid three days before the due date, for example, may be associated with a payment delinquency of "−3."

As another example, a payment delinquency may indicate a range of days that may elapse between the due date and receipt of payment. A payment delinquency for an invoice may be, for example, "1 to 3" The payment delinquency indicates that the invoice is paid one to three days after the due date of the invoice.

As another example, a payment delinquency may simply indicate whether an invoice is delinquent or not. A payment delinquency for an invoice that is delinquent may be "Delinquent." A payment delinquency for an invoice that is not delinquent may be "On Time."

A delinquency estimation engine 113 applies an ensemble of delinquency estimation models 114 to an invoice. Each delinquency estimation model 114 determines an unrefined estimated payment delinquencies 116 for the invoice. A delinquency estimation model is generated using machine learning based on a training set 104 of invoices. Various types of models may be used, such as a decision tree model, a clustering model, a Bayesian network model, a probabilistic graphical model, rule-based model, and/or a support vector machine model. Using a decision tree model as an example, a delinquency estimation model includes a number of nodes, connected through various branches. Each node represents an inquiry regarding one or more attributes associated with an invoice. A result of an inquiry represented by a current node determines which branch, emanating from the current node, to follow to reach another node of the delinquency estimation model. The last node on a particular branch estimates a payment delinquency for the invoice.

A training set 104 of invoices may include all or a subset of invoices generated by one or more companies. As illustrated, for example, a training set 104 of invoices may include only invoices 106a-b that are associated with a default payment reminder schedule 112a. The training set 104 excludes invoices 106c that are associated with modified payment reminder schedules 112b. As another example, a training set of invoices may include only invoices generated by the same company. Hence, different training sets may be used for different companies. The different training sets generates different delinquency estimation models for the different companies. As another example, a training set of invoices may include invoices generated by a group of companies. The same delinquency estimation models may be used by the group of companies.

An ensemble of delinquency estimation models 114 refers to a group of delinquency estimation models 114 that are used together to determine a refined estimated payment delinquency 118. Each of the delinquency estimation models 114 determines a respective unrefined estimated payment delinquency 116 for a particular invoice. The unrefined estimated payment delinquencies 116 are used to determine a refined estimated payment delinquency 118 for the particular invoice. The term "estimated payment delinquency" may be used to refer to an unrefined estimated payment delinquency 116 and/or a refined estimated payment delinquency 118. Examples of operations for using a model to estimate a payment delinquency for an invoice are described below with reference to FIG. 2.

In an embodiment, a delinquency estimation engine 113 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, a user interface 120 refers to hardware and/or software configured to facilitate communications between a user and a delinquency estimation engine 113. A user interface 120 renders user interface elements. A user interface 120 receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

A user interface 120 displays information associated with estimated payment delinquencies. As illustrated, for example, a user interface 120 presents information associated with predicted delinquent invoices 122. Predicted delinquent invoices 122 are invoices with an estimated payment delinquency that is zero or less. As an example, a list of outstanding invoices may be presented at a user interface. A subset of the outstanding invoices that is predicted to be delinquent may be flagged. As another example, various graphs associated with predicted delinquency invoices may be presented at a user interface.

In one or more embodiments, a payment reminder application 124 is programmed to transmit reminders according to a payment reminder schedule (such as default payment reminder schedule 112a or modified payment reminder schedule 112b). A payment reminder application 124 may transmit automated emails via an email system 126. A payment reminder application 124 may make automated telephone calls via a telephone system 128. A payment reminder application 124 may generate alerts via a customer application 130. A customer may log into the customer application 130 to view the alerts.

3. Using a Model to Estimate a Payment Delinquency for an Invoice

Figure 2A:
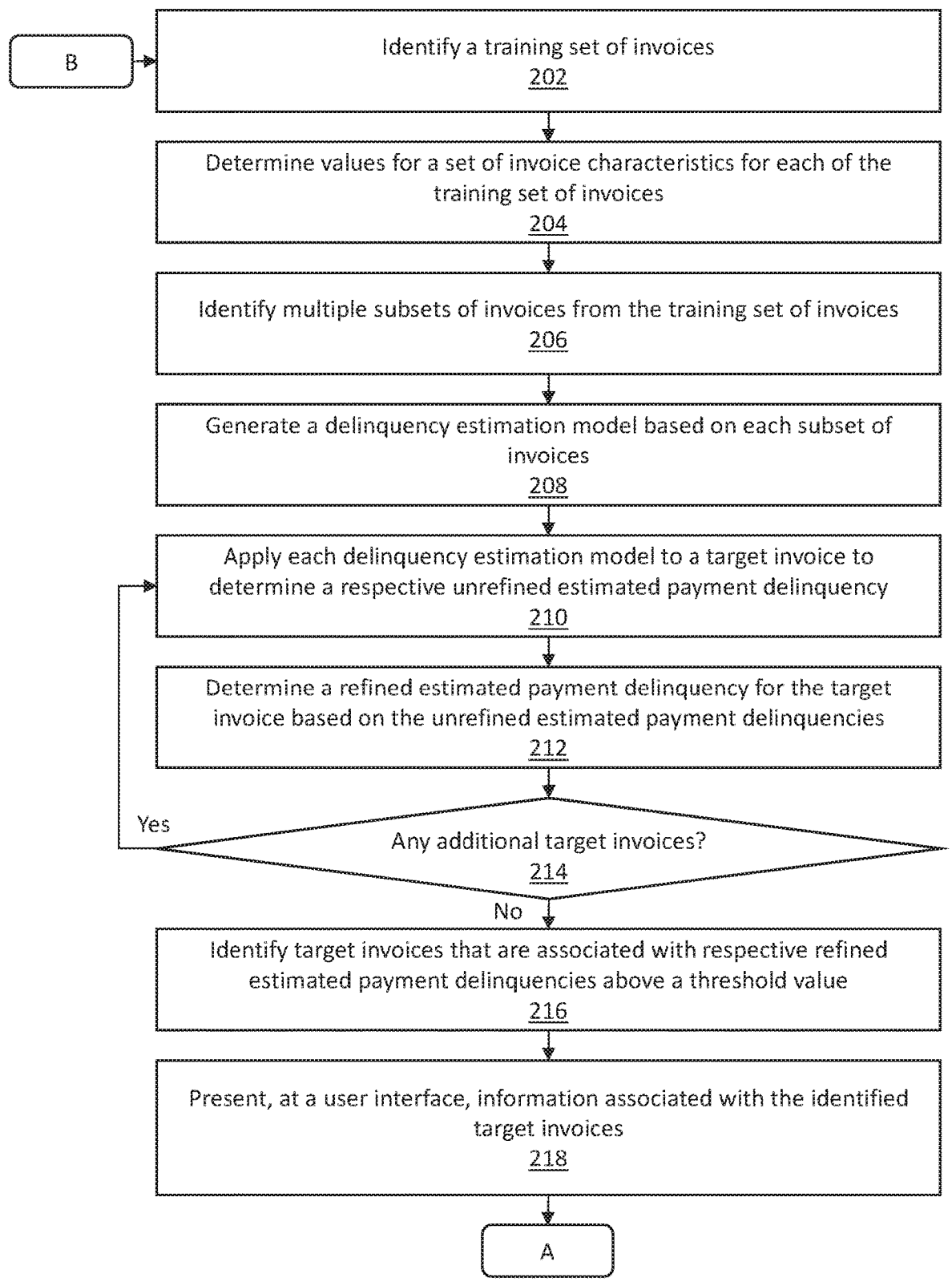
FIGS. 2A-B illustrate an example set of operations for using a model to estimate a payment delinquency for an invoice, in accordance with one or more embodiments.
Figure 2B:
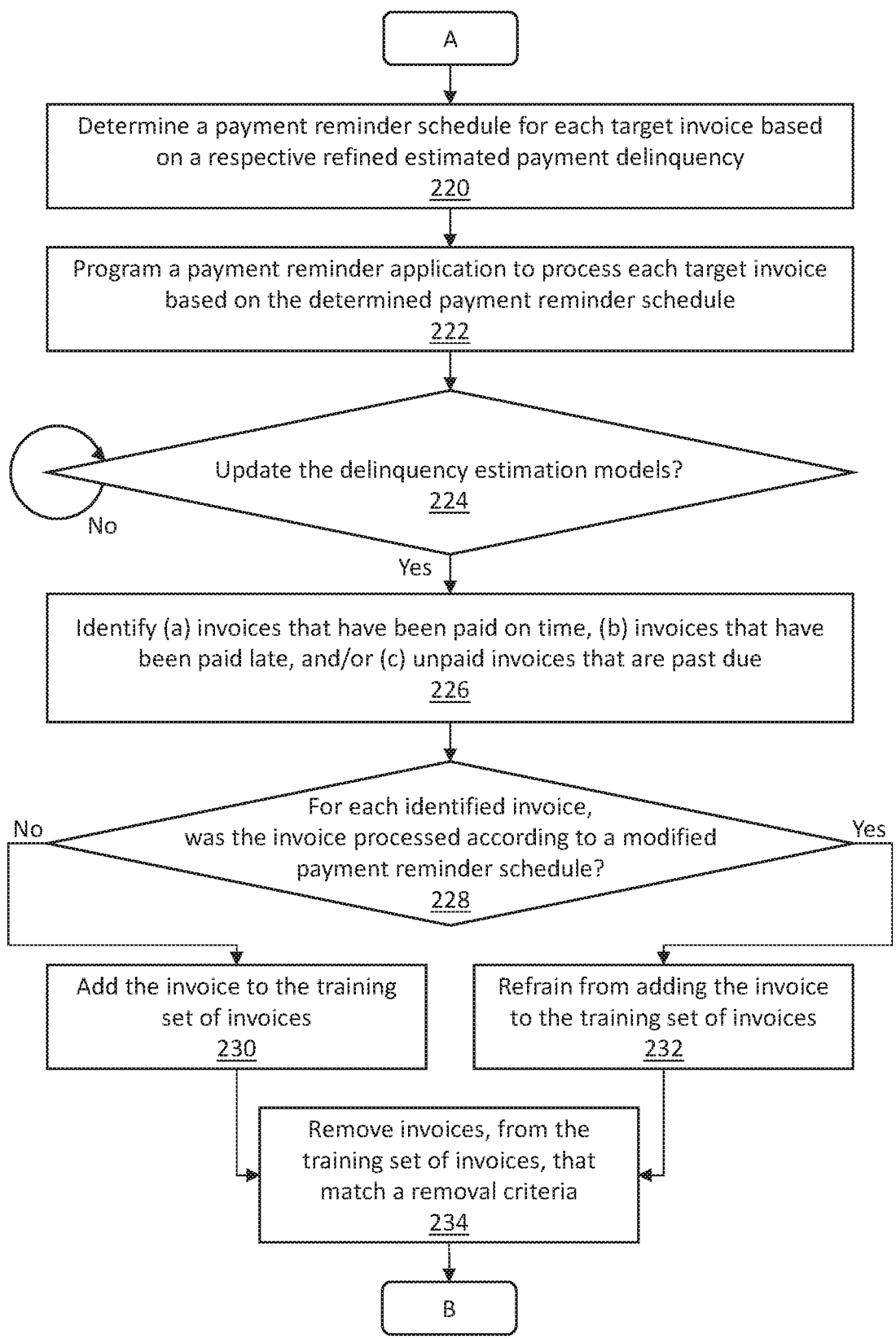

FIGS. 2A-B illustrate an example set of operations for using a model to estimate a payment delinquency for an invoice, in accordance with one or more embodiments. One or more operations illustrated in FIGS. 2A-B may be modified, rearranged, or omitted all together. Accordingly, the particular sequence of operations illustrated in FIGS. 2A-B should not be construed as limiting the scope of one or more embodiments.

One or more embodiments identify a training set of invoices (Operation 202). A delinquency estimation engine 113 identifies a training set of invoices. The training set of invoices may include one or more invoices that were actually issued to customers for goods and/or services purchased by the customers. Additionally or alternatively, the training set of invoices may include one or more invoices that were generated for the purpose of training the delinquency estimation engine 113. The training set of invoices may be iteratively updated, as further described below with reference to Operations 224-234.

In an embodiment, a delinquency estimation engine 113 identifies only invoices associated with a same customer as a training set of invoices. As an example, multiple companies may share a particular database. Invoices issued by the multiple companies may be stored on the same database. A delinquency estimation engine identifies, from the database, only invoices associated with a particular customer. The delinquency estimation engine identifies the invoices to generate delinquency estimation models for the particular customer.

One or more embodiments determine values for a set of invoice characteristics for each of the training set of invoices (Operation 204). The delinquency estimation engine 113 determines values for the invoice characteristics for the training set of invoices. The delinquency estimation engine 113 extracts a value for an invoice characteristic from an invoice database. Additionally or alternatively, the delinquency estimation engine 113 determines a value for an invoice characteristic based on information extracted from an invoice database. As an example, an invoice database may indicate the "Customer" and "Amount Due" for a particular invoice. A delinquency estimation engine may extract the "Customer" and "Amount Due" from the invoice database. Further, the invoice database may store a set of invoices that are associated with the same customer as the particular invoice. The invoice database may indicate the payment delinquencies for each of the invoices associated with the same customer. Based on the information from the invoice database, a delinquency estimation engine may determine "a number of invoices paid by a particular customer," "a number of invoices paid late by a particular customer," and/or other invoice characteristics.

As an example, invoice characteristics may include, "Customer," "Amount Due," and "Payment Delinquency." An invoice database may store a set of invoices associated with the customer, John Doe: Invoice A, Invoice B, and Invoice C. The invoice database may indicate that Invoice A is associated with an "Amount Due" of $100 and a "Payment Delinquency" of 2. The invoice database may indicate that Invoice B is associated with an "Amount Due" of $80 and a "Payment Delinquency" of 0. The invoice database may indicate that Invoice C is associated with an "Amount Due" of $75 and a "Payment Delinquency" of 10.

A delinquency estimation engine may extract information from the invoice database. The delinquency estimation engine may determine that the value for the invoice characteristic "Amount Due" is $100 for Invoice A. The delinquency estimation engine may determine that the value for the invoice characteristic "Amount Due" is $80 for Invoice B. The delinquency estimation engine may determine that the value for the invoice characteristic "Amount Due" is $75 for Invoice C.

Further the delinquency estimation engine may determine that the invoices associated with John Doe include Invoice A, Invoice B, and Invoice C. The delinquency estimation engine may determine that each of Invoice A, Invoice B, and Invoice C have been paid. The delinquency estimation engine may determine that "a number of invoices paid by John Doe" is 3. The delinquency estimation engine may also determine that Invoice A and Invoice C are delinquent. The delinquency estimation engine may determine that "a number of invoices paid late by John Doe" is 2.

One or more embodiments identify multiple subsets of invoices from the training set of invoices (Operation 206). The delinquency estimation engine 113 identifies subsets of invoices from the training set of invoices. The delinquency estimation engine 113 may identify the subsets randomly.

As an example, a training set of invoices may include Invoice A, Invoice B, Invoice C, Invoice D, and Invoice E. A delinquency estimation engine may identify one subset of invoices as Invoice A, Invoice B, and Invoice D. The delinquency estimation engine may identify another subset of invoices as Invoice B, Invoice C, and Invoice E.

One or more embodiments generate a delinquency estimation model based on each subset of invoices (Operation 208). The delinquency estimation engine 113 applies a particular subset of invoices to a machine learning algorithm. The machine learning algorithm may be, for example, a decision tree algorithm. The machine learning algorithm generates a particular delinquency estimation model based on the particular subset of invoices. The delinquency estimation engine 113 iterates the machine learning algorithm on each subset of invoices. The delinquency estimation engine 113 generates a group of delinquency estimation models. The group of delinquency estimation models may also be referred to as an "ensemble of delinquency estimation models."

A delinquency estimation model may use any or all of the set of invoice characteristics to determine an estimated payment delinquency. Each of an ensemble of delinquency estimation models may use the same or different invoice characteristics. Each of an ensemble of delinquency estimation models may apply the same or different weights to each of the invoice characteristics.

As an example, a set of invoice characteristics may include: "Amount Due," "Number of Days Until Due," "Number of Invoices Paid Late by Customer of Target Invoice," and "Number of Outstanding Invoices for Customer of Target Invoice." An ensemble of delinquency estimation models may include Model A and Model B.

Model A may use the invoice characteristics "Amount Due," and "Number of Invoices Paid Late by Customer of Target Invoice." Model A estimates a payment delinquency for a target invoice based on the "Amount Due" for the target invoice, and "Number of Invoices Paid Late by Customer of Target Invoice." Model A may indicate that where the "Amount Due" is above $500, and the "Number of Invoices Paid Late by Customer of Target Invoice" is above 500, then the target invoice is predicted to be delinquent.

Model B may use "Amount Due," "Number of Invoices Paid Late by Customer of Target Invoice," and "Number of Outstanding Invoices for Customer of Target Invoice." Model B estimates a payment delinquency for a target invoice based on the "Amount Due" for the target invoice, "Number of Invoices Paid Late by Customer of Target Invoice," and "Number of Outstanding Invoices for Customer of Target Invoice." Model B may indicate that where the "Amount Due" is above $100, and the "Number of Invoices Paid Late by Customer of Target Invoice" is above 400, and the "Number of Outstanding Invoices for Customer of Target Invoice" is above 800, then the target invoice is predicted to be delinquent.

One or more embodiments apply each delinquency estimation model to a target invoice to determine a respective unrefined estimated payment delinquency (Operation 210). The delinquency estimation engine 113 obtains a target invoice. The delinquency estimation engine 113 may obtain the target invoice from an invoice generation engine and/or an invoice database. The target invoice may be an invoice for goods and/or services provided to a customer. Alternatively, the target invoice may be an invoice for goods and/or services that are about to be provided to a customer. The invoice may be but is not necessarily already delivered and/or transmitted to the customer.

The delinquency estimation engine 113 determines values for the set of invoice characteristics for the target invoice. Examples of operations for determining values for invoice characteristics for an invoice are described above with reference to Operation 204.

The delinquency estimation engine 113 applies a particular delinquency estimation model generated at Operation 208 to the target invoice. In particular, the delinquency estimation engine 113 applies the particular delinquency estimation to the values for at least a subset of the set of invoice characteristics for the target invoice. Based on the particular delinquency estimation model, the delinquency estimation engine 113 obtains an unrefined estimated payment delinquency for the target invoice. The delinquency estimation engine 113 iterates applying each of the ensemble of delinquency estimation models to the target invoice. The delinquency estimation engine 113 obtains an unrefined estimated payment delinquency using each of the ensemble of delinquency estimation models.

As an example, an ensemble of delinquency estimation models may include Model A and Model B. A delinquency estimation engine may apply Model A to a target invoice. Based on Model A, an unrefined estimated payment delinquency for the target invoice may be a range of "3 to 5 days." The range of "3 to 5 days" indicates that the target invoice is predicted to be paid between 3 and 5 days after the due date. The delinquency estimation engine may apply Model B to the target invoice. Based on Model B, an unrefined estimated payment delinquency for the target invoice may be a range of "6 to 8 days." The range of "6 to 10 days" indicates that the target invoice is predicted to be paid between 6 and 8 days after the due date.

One or more embodiments determine a refined estimated payment delinquency for the target invoice based on the unrefined estimated payment delinquencies (Operation 212). The delinquency estimation engine 113 may determine the refined estimated payment delinquency based on an average and/or mid-point of the unrefined estimated payment delinquencies. As an example, an ensemble of delinquency estimation models may include Model A and Model B. Based on Model A, an unrefined estimated payment delinquency for a target invoice may be a range of "3 to 5 days." Based on Model B, an unrefined estimated payment delinquency for the target invoice may be a range of "6 to 8 days." A delinquency estimation engine may determine a mid-point of the unrefined estimated payment delinquencies. The mid-point of the unrefined estimated payment delinquencies may be "4.5 to 6.5 days." Hence, the refined estimated payment delinquencies may be "4.5 to 6.5 days."

Alternatively, the delinquency estimation engine 113 may determine the refined estimated payment delinquency based on what the majority of the unrefined estimated payment delinquencies indicates. As an example, an ensemble of delinquency estimation models may include Model A, Model B, and Model C. Based on Model A, an unrefined estimated payment delinquency for a target invoice may be "Delinquent." Based on Model B, an unrefined estimated payment delinquency for the target invoice may be "On Time." Based on Model C, an unrefined estimated payment delinquency for the target invoice may be "On Time." A delinquency estimation engine may determine that the majority of the unrefined estimated payment delinquencies indicates that the target invoice will be paid "On Time." Hence, the refined estimated payment delinquencies may be "On Time."

Additional and/or alternative methods for determining a refined estimated payment delinquency for the target invoice based on the unrefined estimated payment delinquencies may be used.

One or more embodiments determine whether there are any additional target invoices (Operation 214). The delinquency estimation engine 113 determines whether there are any additional invoices for which a payment delinquency has not yet been estimated. The additional invoices may be newly-generated invoices. The additional invoices may be invoices stored in an invoice database for which a payment delinquency has not yet been estimated. The delinquency estimation engine 113 obtains the additional invoices from an invoice generation engine and/or an invoice database. Examples of operations for obtaining a target invoice are described above with reference to Operation 210.

If there is an additional target invoice, the delinquency estimation engine 113 iterates Operations 210-212 with respect to the additional target invoice. Hence, the delinquency estimation engine 113 determines a respective refined estimated payment delinquency for each target invoice.

One or more embodiments identify target invoices that are associated with respective refined estimated payment delinquencies above a threshold value (Operation 216). The delinquency estimation engine 113 compares each refined estimated payment delinquency for each target invoice against the threshold value. The threshold value indicates an estimated payment delinquency above which the associated invoice becomes of interest.

The delinquency estimation engine 113 identifies which target invoices are associated with a refined estimated payment delinquency that is above the threshold value. The delinquency estimation engine 113 identifies which target invoices are associated with a refined estimated payment delinquency that is below the threshold value.

One or more embodiments present, at a user interface, information associated with the invoices identified at Operation 216 (Operation 218). The delinquency estimation engine 113 identifies information associated with the invoices having a refined estimated payment delinquency above the threshold value. The delinquency estimation engine 113 causes the information to be presented at a user interface.

In an embodiment, a list of outstanding invoices are displayed at a user interface. Each outstanding invoice that is predicted to have a payment delinquency above the threshold value is displayed with a special flag. A user viewing the user interface is able to easily identify the invoices that are of interest to the user. The user may determine to perform different collection actions on the invoices of interest.

In an embodiment, a list of outstanding invoices are displayed at a user interface. The outstanding invoices are ranked based on the respective estimated payment delinquencies. Invoices with the greatest estimated payment delinquencies may be displayed first in a list of outstanding. Invoices with the least estimated payment delinquencies may be displayed last in the list of outstanding.

In an embodiment, a graph associated with invoices of interest are displayed at a user interface. A graph may include "age of invoice" as one dimension and "amount due on invoice" as another dimension. The "age of invoice" may be a number of days from issuance of the invoice to present. Each invoice of interest may be plotted on the graph. Another graph may be a bar chart. Each bar may indicate the number of invoices of interest for a respective customer. Additional and/or alternative graphs may be displayed. A user may determine an order in which to process outstanding invoices based on the graphs. Additionally or alternatively, a user may determine to perform different collection actions based on the age of the invoices, the amounts due, and/or the number of invoices of interest for the same customer.

As an example, a delinquency estimation engine may determine that a large number of invoices are associated with an estimated payment delinquency that is above a threshold value. The invoices associated with an estimated payment delinquency above the threshold value are deemed as invoices of interest. A user may not be able to efficiently go through each invoice of interest. A scatter plot may have "age of invoice" as one dimension and "amount due on invoice" as another dimension. The invoices of interest may be plotted on the scatter plot. Based on the scatter plot, the user may easily select invoices that are the oldest (associated with the greatest "age of invoice") and have the greatest amounts due. The user may prioritize processing of the invoices that are the oldest and have the greatest amounts due. The user may use more aggressive collection actions for the invoices that are the oldest and have the greatest amounts due.

One or more embodiments determine a payment reminder schedule for each target invoice based on a respective refined estimated payment delinquency (Operation 220). The delinquency estimation engine 113 determines a payment reminder schedule for a target invoice based on an estimated payment delinquency. A payment reminder schedule that is determined based on an estimated payment delinquency may include collection actions to be performed as soon as the estimated payment delinquency is determined. Hence, collection actions may be scheduled for performance prior to a due date for an invoice.

In an embodiment, the delinquency estimation engine 113 is associated with a candidate set of payment reminder schedules. Each payment reminder schedule corresponds to a different estimated payment delinquency. Alternatively, each payment reminder schedule corresponds to a different range of estimated payment delinquencies. As an example, a "Friendly Schedule" corresponds to estimated payment delinquencies below 3. A "Moderate Schedule" corresponds to estimated payment delinquencies between 3 and 7. An "Aggressive Schedule" corresponds to estimated payment delinquencies above 7. At least one of the candidate set of payment reminder schedules may be referred to as a "default payment reminder schedule." The default payment reminder schedule may correspond to invoices that are predicted to be paid on time. Additionally or alternatively, the default payment reminder schedule may correspond to invoices that are associated with an estimated payment delinquency below a threshold value. The remaining payment reminder schedules, in the candidate set of payment reminder schedules, may be referred to as "modified payment reminder schedules."

The delinquency estimation engine 113 determines an estimated payment delinquency for a target invoice. The delinquency estimation engine 113 determines a particular payment reminder schedule corresponding to the estimated payment delinquency. The delinquency estimation engine 113 associates the target invoice with the particular payment reminder schedule. The delinquency estimation engine 113 may cause an invoice database to store information indicating the target invoice is associated with the particular payment reminder schedule.

In an embodiment, the delinquency estimation engine 113 is associated with a default payment reminder schedule. The default payment reminder schedule applies to invoices for which a payment delinquency has not been estimated. Additionally or alternatively, the default payment reminder schedule applies to invoices for which an estimated payment delinquency is below a threshold value. The delinquency estimation engine 113 modifies the default payment reminder schedule based on an estimated payment delinquency for a target invoice. The delinquency estimation engine 113 may modify the collection actions and/or corresponding wait intervals. The delinquency estimation engine 113 may add or remove collection actions. The delinquency estimation engine 113 associates the target invoice with the modified payment reminder schedule. The delinquency estimation engine 113 may cause an invoice database to store information indicating the target invoice is associated with the modified payment reminder schedule.

As an example, a default payment reminder schedule may indicate the following: At one week after due date, send a friendly email reminder; at one month after due date, provide a telephone reminder. A delinquency estimation engine may determine that a first target invoice is predicted to be delinquent by "3 to 5 days." The delinquency estimation engine may modify the default payment reminder schedule to generate a modified payment reminder schedule. The delinquency estimation engine may modify the default payment reminder schedule such that the first collection action is performed "within one day of determining the estimated payment delinquency for the target invoice" (rather than "at one week after due date"). Hence, the modified payment reminder schedule for the first target invoice may indicate the following: Within one day of determining the estimated payment delinquency for the target invoice, send a friendly email reminder; at one month after due date, provide a telephone reminder.

Additionally, the delinquency estimation engine may determine that a second target invoice is predicted to be delinquent by "6 to 8 days." The delinquency estimation engine may modify the default payment reminder schedule to generate another modified payment reminder schedule. The delinquency estimation engine may modify the default payment reminder schedule by adding another collection action. Hence, the modified payment reminder schedule for the second target invoice may indicate the following: At one week after due date, send a friendly email reminder; at two weeks after due date, send an aggressive email reminder; at one month after due date, provide a telephone reminder.

In an embodiment, the delinquency estimation engine 113 modifies the payment terms for an invoice associated with an estimated payment delinquency that is above a threshold value. Different payment terms may correspond to different estimated payment delinquencies.

As an example, a particular invoice may be predicted to have a payment delinquency of three months. The threshold for identifying invoices that require modified payment terms may be two months. The estimated payment delinquency of three months is greater than the threshold value. Hence, a delinquency estimation engine may modify payment terms for the particular invoice.

Continuing the example, a modified payment term may include a discount for payment that is received within one month of the due date. The modified payment term may correspond to invoices with estimated payment delinquencies above the threshold value. The delinquency estimation engine may use cause the particular invoice to be issued (or re-issued) using the modified payment term.

One or more embodiments program a payment reminder application to process each target invoice based on the payment reminder schedule determined at Operation 220 (Operation 222). The delinquency estimation engine 113 programs a payment reminder application 124 to process a target invoice based on the payment reminder schedule determined for the invoice. Without the programming by the delinquency estimation engine 113, the payment reminder application 124 may process invoices based on a default payment reminder schedule. However, the delinquency estimation engine 113 may modify code of the payment reminder application 124 such that the payment reminder application 124 processes a target invoice based on a modified payment reminder schedule.

In an embodiment, a collection action included in a payment reminder schedule is to transmit an automated email to a customer via an email system 126. The automated email may be a template email stored within the email system 126. Based on the payment reminder schedule, a payment reminder application 124 generates an email using the email template. The payment reminder application 124 populates the email with the email address of a customer. The payment reminder application 124 causes the email to be transmitted via the email system 126.

In an embodiment, a collection action included in a payment reminder schedule is to provide an automated telephone call to a customer via a telephone system 128. The automated phone call may be a recorded message stored within the telephone system 128. Based on the payment reminder schedule, a payment reminder application 124 causes a telephone call to be placed to the customer. The payment reminder application 124 causes a recorded message to be played to the customer via the telephone system 128.

In an embodiment, a collection action included in a payment reminder schedule is to provide alert to a customer via a customer application 130. A customer application 130 may be an application through which a customer may view an order status, view a payment status, make a purchase order, make payments, and/or receive messages from the company providing the goods and/or services. Based on the payment reminder schedule, a payment reminder application 124 causes an alert to be transmitted to a customer via the customer application 130. The customer may view the alert when the customer logs onto the customer application 130.

One or more embodiments determine whether to update the delinquency estimation models (Operation 224). The delinquency estimation models generated at Operation 208 may be updated based on various factors. In an embodiment, the delinquency estimation models are updated on a periodic basis. The delinquency estimation models may be updated, for example, one a week. In an embodiment, the delinquency estimation models may be updated based on the number of new invoices that have been processed by the delinquency estimation engine 113. The delinquency estimation models may be updated, for example, after 10,000 new invoices have been processed by the delinquency estimation engine 113. In an embodiment, the delinquency estimation models may be updated based on the sum of amounts due for new invoices that have been processed by the delinquency estimation engine 113. As an example, a delinquency estimation engine processes target invoices using a current ensemble of delinquency estimation models. The sum of the amounts due on the processed target invoices may reach $100,000. Once the sum of the amounts due reaches $100,000, the delinquency estimation engine may determine that the ensemble of delinquency estimation models needs to be updated.

One or more embodiments identify (a) invoices that have been paid on time, (b) invoices that have been paid late, and/or (c) unpaid invoices that are past due (Operation 226). The delinquency estimation engine 113 identifies invoices that may potentially be added to the training set of invoices previously used at Operation 202. Potential invoices to be added include (a) target invoices that have been paid on time, (b) target invoices that have been paid late, and/or (c) unpaid invoices that are past due.

In an embodiment, the delinquency estimation models are used to estimate a number of days that would elapse from the due date of the invoice to payment of the invoice. The training set of invoices used to generate the delinquency estimation models does not include any unpaid invoices. The payment date for unpaid invoices is unknown. Therefore unpaid invoices cannot be used to train delinquency estimation models that estimate a number of days that would elapse from the due date of the invoice to payment of the invoice.

In an embodiment, the delinquency estimation models are used to estimate whether an invoice would be delinquent or not. The delinquency estimation models do not estimate a number of days that would elapse from the due date of the invoice to payment of the invoice. The training set of invoices may but does not necessarily include unpaid invoices that are past due. Unpaid invoices that are past due are already known as being "Delinquent." Therefore unpaid invoices that are past due can be used to train delinquency estimation models that predict whether an invoice would be delinquent or not.

An invoice database maintains information associated with invoices generated by a company. The invoice database stores the due dates and the payment dates for the invoices. Based on the tracked information associated with the invoices maintained in the invoice database, the delinquency estimation model 113 identifies (a) target invoices that have been paid on time, (b) target invoices that have been paid late, and/or (c) unpaid target invoices that are past due.

One or more embodiments determine whether each invoice was processed according to a modified payment reminder schedule (Operation 228). As described above at Operation 220, the delinquency estimation engine 113 determines a payment reminder schedule for each target invoice. The payment reminder application processes each invoice according to the associated payment reminder schedule. In some instances, however, the payment reminder application may be intercepted to process a particular invoice according to a different payment reminder schedule. A data repository associated with the payment reminder application (and/or the invoice database) records information indicating which payment reminder schedule is actually used for processing each invoice. The delinquency estimation engine 113 uses the information to determine whether each invoice, identified at Operation 226, was processed according to a modified payment reminder schedule or a default payment reminder schedule.

As an example, a delinquency estimation engine may determine that a particular target invoice should be processed according to a modified payment reminder schedule. However, a user may input a command to request the payment reminder application to process the particular target invoice according to a default payment reminder schedule. A data repository may store information indicating that the particular target invoice was processed according to the default payment reminder schedule. Based on the information stored in the data repository, a delinquency estimation engine may determine that the particular target invoice was processed according to the default payment reminder schedule, rather than the modified payment reminder schedule.

One or more embodiments add invoices that were not processed according to a modified payment reminder schedule to the training set of invoices (Operation 230). The delinquency estimation engine 113 adds invoices that were not processed according to a modified payment reminder schedule, as determined at Operation 228, to the training set of invoices. The training set of invoices, with the newly added invoices, are used to re-train and update the delinquency estimation models.

One or more embodiments refrain from adding invoices that were processed according to a modified payment reminder schedule to the training set of invoices (Operation 230). The delinquency estimation engine 113 refrains from adding invoices that were processed according to a modified payment reminder schedule, as determined at Operation 228, to the training set of invoices. The actual payment delinquency for the invoices that were processed according to a modified payment reminder schedule have been affected by the modified payment reminder schedule. Hence, the invoices that were processed according to a modified payment reminder schedule are not used to re-train the delinquency estimation models.

In another embodiment, the invoices that were processed according to a modified payment reminder schedule are added to the training set of invoices. The invoice characteristics of the training set of invoices includes a characteristic indicating whether an invoice was processed according to a modified payment reminder schedule or a default payment reminder schedule. The delinquency estimation models are trained based on the invoice characteristics of the training set of invoices. Hence, the training of the delinquency estimation models takes into account which payment delinquencies, of the training set of invoices, were affected by a modified payment reminder schedule.

One or more embodiments remove invoices from the training set of invoices that match a removal criteria (Operation 234). Various removal criteria may be used. As an example, a removal criteria may be invoices that were issued prior to a particular date. Old invoices (older than the particular date) are removed from the training set of invoices. As another example, a removal criteria may be invoices issued to a particular customer. The particular customer may be in great debt or may have declared bankruptcy. Hence, the particular customer may not be representative of other customers of the company. The invoices issued to the particular customer are removed from the training set of invoices.

The training set of invoices (including the invoices added at Operation 230 and excluding the invoices removed at Operation 234) are used to re-train the delinquency estimation models. The delinquency estimation engine 113 iterates Operations 202-208 using the training set of invoices. The delinquency estimation engine 113 generates an ensemble of updated delinquency estimation models. The delinquency estimation engine 113 may iterate Operations 210-222 using the updated delinquency estimation models. The delinquency estimation engine 113 may apply the updated delinquency estimation models to the same target invoices as the previous iteration of Operations 210-222. Additionally or alternatively, the delinquency estimation engine 113 may apply the updated delinquency estimation models to different target invoices, such as invoices that were newly generated since the last iteration of Operations 210-222.

4. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 3:
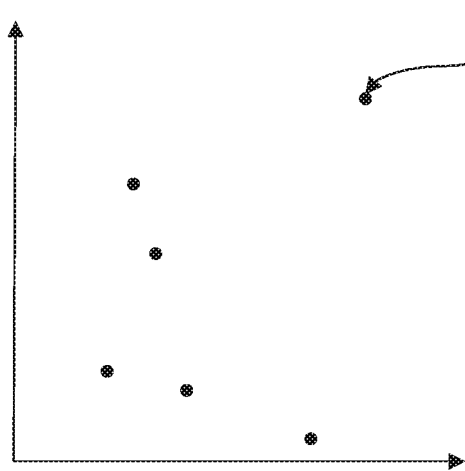
FIG. 3 is an example of a graph presenting information associated with invoices that are predicted to be delinquent, in accordance with one or more embodiments.

FIG. 3 is an example of a graph presenting information associated with invoices that are predicted to be delinquent, in accordance with one or more embodiments. As illustrated, a graph 300 is a scatter plot presenting information associated with invoices that are predicted to be delinquent. The invoices are predicted to be delinquent based on a delinquency estimation engine 113, as described above.

The graph 300 includes "Age of Invoice" on the x-axis and "Amount Due for Invoice" on the y-axis. The "Age of Invoice" and "Amount Due for Invoice" are determined for each predicted delinquent invoice. Each predicted delinquent invoice is plotted on the graph 300. As an example, the age of a particular invoice may be three months. The amount due for the particular invoice may be $10,000. A scatter plot may include a point representing the particular invoice. The point would correspond to "three months" on the "Age of Invoice" axis and "$10,000" on the "Amount Due for Invoice" axis. A user may determine an order in which to process predicted delinquent invoices based on the graph 300. Additionally or alternatively, a user may determine to perform different collection actions for different predicted delinquent invoices based on the graph 300.

As an example, a user may determine that point 302 is an outlier on the graph 300. The point 302 represents a particular invoice that has an "Age of Invoice" that is significantly greater than other predicted delinquent invoices. Further, the particular invoice has an "Amount Due for Invoice" that is significantly greater than other predicted delinquent invoices. The user may prioritize processing the particular invoice over other predicted delinquent invoices. The user may adopt aggressive collection actions for the particular invoice, as compared with collection actions for other predicted delinquent invoices.

Figure 4:
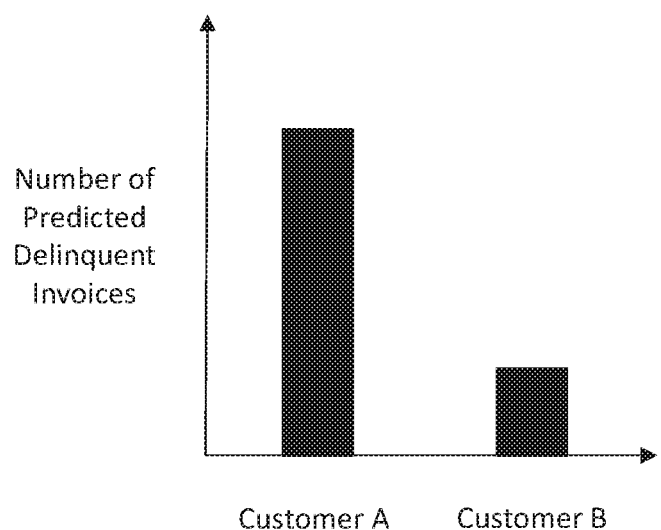
FIG. 4 is an example of another graph presenting information associated with invoices that are predicted to be delinquent, in accordance with one or more embodiments.

FIG. 4 is an example of another graph presenting information associated with invoices that are predicted to be delinquent, in accordance with one or more embodiments. As illustrated, a graph 400 is a bar chart presenting information associated with invoices that are predicted to be delinquent. The invoices are predicted to be delinquent based on a delinquency estimation engine 113, as described above.

The graph 400 includes "Number of Predicted Delinquent Invoices" on the y-axis. The graph 400 includes the respective customers on the x-axis. The number of predicted delinquent invoices for each customer is determined. Each bar in the graph 400 represents the number of predicted delinquent invoices for a respective customer. A user may determine an order in which to process predicted delinquent invoices based on the graph 300. Additionally or alternatively, a user may determine to perform different collection actions for different predicted delinquent invoices based on the graph 300.

As an example, a user may determine that Customer A has a large number of predicted delinquent invoices as compared with Customer B. The user may prioritize processing invoices issued to Customer A over invoices issued to Customer B. The user may adopt aggressive collection actions for invoices issued to Customer A, as compared with collection actions for other predicted delinquent invoices. The user may adopt collection actions that aim to collect on all invoices issued to Customer A, rather than collecting on each invoice individually. The user may, for example, modify payment terms for Customer A based on the sum of amounts due for all invoices issued to Customer A.

Figure 5:
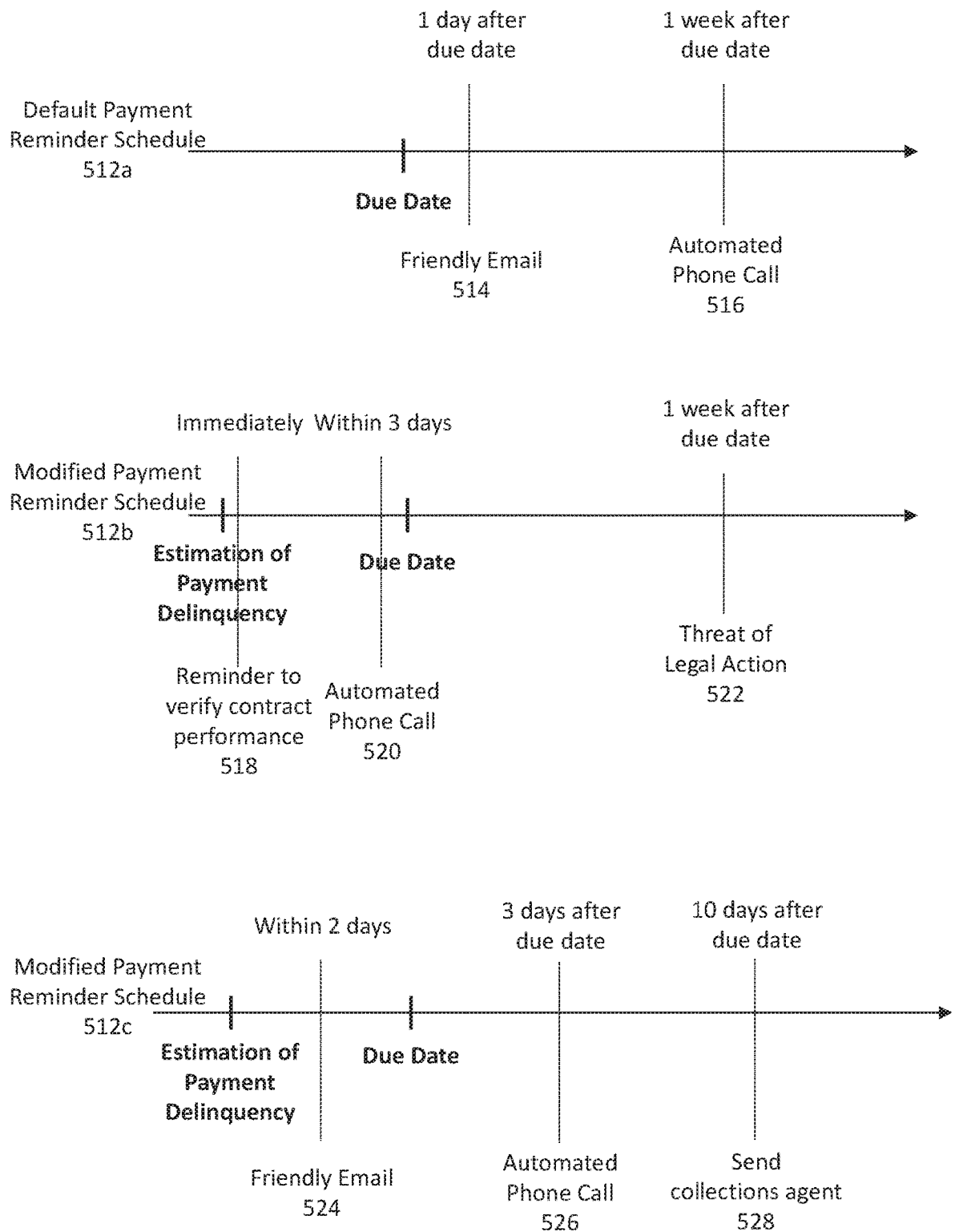
FIG. 5 is an example of various payment reminder schedules that may be used for invoices that are predicted to have different payment delinquencies, in accordance with one or more embodiments.

FIG. 5 is an example of various payment reminder schedules that may be used for invoices that are predicted to have different payment delinquencies, in accordance with one or more embodiments. As illustrated, there is a default payment reminder schedule 512a, and two modified payment reminder schedules 512b-c.

The default payment reminder schedule 512a indicates a first collection action 512 as follows: At one day after due date, send a friendly email. The default payment reminder schedule 512a indicates a second collection action 516 as follows: At one week after due date, make an automated telephone call.

The modified payment reminder schedule 512b indicates a first collection action 518 as follows: Immediately after estimation of a payment delinquency for an invoice, send a reminder to verify contract performance. The user (such as an employee of a company that provides goods and/or services) is reminded to verify that the company has performed its obligations under the contract. The modified payment reminder schedule 512b indicates a second collection action 520 as follows: Within three days after estimation of the payment delinquency, provide an automated telephone call. The modified payment reminder schedule 512b indicates a third collection action 522 as follows: At one week after due date, provide a threat of legal action.

The modified payment reminder schedule 512c indicates a first collection action 524 as follows: Within two days after estimation of a payment delinquency for an invoice, send a friendly email. The modified payment reminder schedule 512c indicates a second collection action 526 as follows: At three days after due date, provide an automated telephone call. The modified payment reminder schedule 512c indicates a third collection action 528 as follows: At ten days after due date, send a collections agent to the customer to request payment.

Each payment reminder schedule 512a-c is associated with a different level of aggressiveness for collecting payment for an invoice. The default payment reminder schedule 512a is less aggressive. The modified payment reminder schedules 512b-c are more aggressive.

Each payment reminder schedule 512a-c corresponds to different estimated payment delinquencies. Less aggressive payment reminder schedules correspond to smaller estimated payment delinquencies. The default payment reminder schedule 512a corresponds to an estimated payment delinquency of zero (which indicates that the invoice is predicted to be paid on time). The modified payment reminder schedule 512b corresponds to estimated payment delinquencies between one and five days. The modified payment reminder schedule 512c corresponds to estimated payment delinquencies greater than five days.

A delinquency estimation engine 113 may determine which payment reminder schedule 512a-c to associate with a particular invoice based on the estimated payment delinquency for the particular invoice. As an example, a particular invoice may be predicted to have a payment delinquency of zero. The delinquency estimation engine 113 may associate the default payment reminder schedule 512a with the particular invoice.

The delinquency estimation engine 113 programs a payment reminder application 124 to perform collection actions for an invoice based on a selected payment reminder schedule. As an example, a payment reminder application 124 may process invoices according to a default payment reminder schedule 512a. However, a delinquency estimation engine 113 may determine that an estimated payment delinquency for a particular invoice is two to three days. The delinquency estimation engine 113 may associate a modified payment reminder schedule 512b with the particular invoice. The delinquency estimation engine 113 may program the payment reminder application 124 to process the particular invoice according to the modified payment reminder schedule 512b, rather than the default payment reminder schedule 512a. Programming the payment reminder application 124 may include modifying code of the payment reminder application 124 and/or modifying a configuration of the payment reminder application 124.

The payment reminder application processes an invoice according to a selected payment reminder schedule. As an example, based on collection action 514, the payment reminder application 124 may look up a template for a friendly email from an email system 126. The payment reminder application 124 may use the email system 126 to transmit the friendly email to a customer.

As an example, based on collection action 516, the payment reminder application 124 may look up a recorded message from a telephone system 128. The payment reminder application 124 may use the telephone system 128 to place the automated telephone call. The payment reminder application 124 causes the recorded message to be played during the automated telephone call.

As an example, based on collection action 518, the payment reminder application 124 may transmit an alert or reminder to a user (such as an employee of a company that provides goods and/or services). The payment reminder application 124 may cause the alert to be transmitted via an application internal to the company. The user may view the alert when he logs onto the internal application.

As an example, based on collection action 522, the payment reminder application 124 may look up a template for a letter that threatens legal action. The payment reminder application 124 may cause the letter to be printed and/or put in the mail, for delivery to the customer.

As an example, based on collection action 528, the payment reminder application 124 may transmit a request to a collections agency to send a collections agent to a customer. The request may be transmitted via email, telephone, an application, and/or other means. Based on the request, the collections agency may send a collections agent to the customer.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
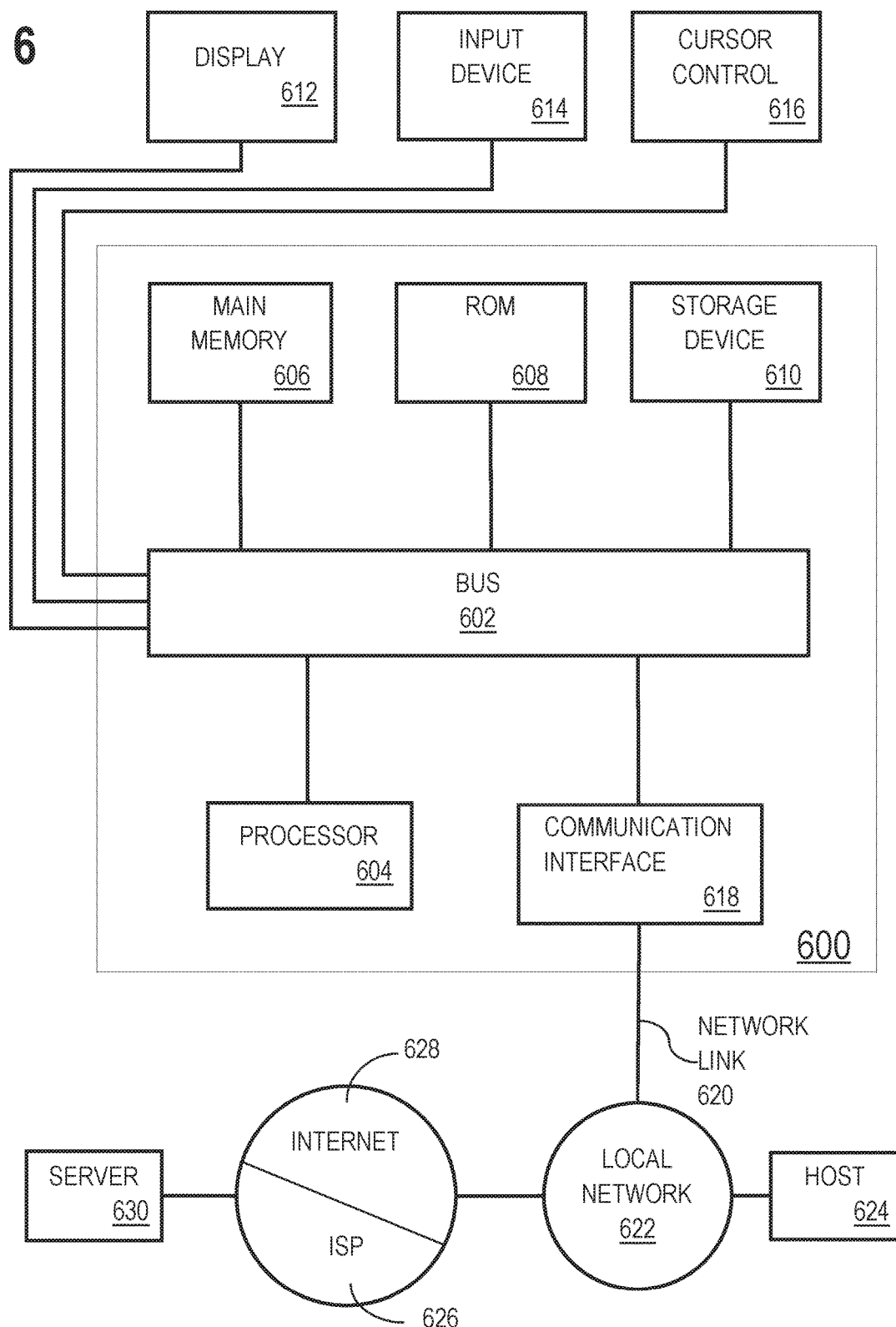
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
    identifying a training set of invoices, for training a set of delinquency estimation models, wherein the training set of invoices is associated with a set of one or more invoice characteristics, and the training set of invoices indicate a respective first set of values for the set of invoice characteristics;
    generating a first delinquency estimation model using machine learning based on the training set of invoices;
    generating a second delinquency estimation model using machine learning based on the training set of invoices;
    determining a set of respective estimated payment delinquencies for a target set of invoices using the first delinquency estimation model and the second delinquency estimation model;
    identifying a first subset of the target set of invoices for which respective payment reminder schedules were modified based on the respective estimated payment delinquencies for the first subset of the target set of invoices;
    identifying a second subset of the target set of invoices for which respective payment reminder schedules were not modified based on the respective estimated payment delinquencies for the second subset of the target set of invoices;
    identifying a new training set of invoices, for training the set of delinquency estimation models, that includes the second subset of the target set of invoices but does not include the first subset of the target set of invoices, wherein the new training set of invoices is associated with the set of invoice characteristics, and the new training set of invoices indicate a respective second set of values for the set of invoice characteristics;
    updating the first delinquency estimation model using machine learning based on a first subset of the new training set of invoices;
    updating the second delinquency estimation model using machine learning based on a second subset of the new training set of invoices.

2. The medium of claim 1, wherein the operations further comprise:
    applying the updated first delinquency estimation model to values for at least a first subset of the set of invoice characteristics for a particular invoice to estimate a first estimated payment delinquency for the particular invoice;
    applying the updated second delinquency estimation model to values for at least a second subset of the set of invoice characteristics for the particular invoice to estimate a second estimated payment delinquency for the particular invoice;
    determining a particular estimated payment delinquency for the particular invoice based at least on the first estimated payment delinquency and the second estimated payment delinquency.

3. The medium of claim 1, wherein the operations further comprise:
    determining a particular estimated payment delinquency for a particular invoice of the first subset of the target set of invoice;
    determining a modified payment reminder schedule for the particular invoice based on the particular estimated payment delinquency; and programming an application to transmit a first set of reminders for the particular invoice based on the modified payment reminder schedule.

4. The medium of claim 1, wherein the set of invoice characteristics comprises one or more of:
   (a) a base amount for an invoice;
   (b) a payment term;
   (c) a number of invoices paid by a particular customer;
   (d) a sum of base amounts paid by the particular customer;
   (e) a number of invoices paid late by the particular customer;
   (f) a sum of base amounts paid late by the particular customer;
   (g) an average number of days by which payments for invoices are late for the particular customer;
   (h) a number of outstanding invoices for the particular customer;
   (i) a sum of base amounts of outstanding invoices for the particular customer;
   (j) a number of past-due outstanding invoices for the particular customer;
   (k) a sum of base amounts of past-due outstanding invoices for the particular customer; and
   (l) an average number of days by which payments for the past-due outstanding invoices are late for the particular customer.

5. The medium of claim 1, wherein the operations further comprise:
   applying the first delinquency estimation model to the target set of invoices to predict whether each of the target set of invoices would be delinquent or not delinquent.

6. The medium of claim 1, wherein:
   the set of invoice characteristics comprises one or more of:
      (a) a base amount for an invoice;
      (b) a payment term;
      (c) a number of invoices paid by a particular customer;
      (d) a sum of base amounts paid by the particular customer;
      (e) a number of invoices paid late by the particular customer;
      (f) a sum of base amounts paid late by the particular customer;
      (g) an average number of days by which payments for invoices are late for the particular customer;
      (h) a number of outstanding invoices for the particular customer;
      (i) a sum of base amounts of outstanding invoices for the particular customer;
      (j) a number of past-due outstanding invoices for the particular customer;
      (k) a sum of base amounts of past-due outstanding invoices for the particular customer; and
      (l) an average number of days by which payments for the past-due outstanding invoices are late for the particular customer;
   the operations further comprise:
      applying the first delinquency estimation model to the target set of invoices to predict whether each of the target set of invoices would be delinquent or not delinquent;
      applying the updated first delinquency estimation model to values for at least a first subset of the set of invoice characteristics for a particular invoice to estimate a first estimated payment delinquency for the particular invoice;
      applying the updated second delinquency estimation model to values for at least a second subset of the set of invoice characteristics for the particular invoice to estimate a second estimated payment delinquency for the particular invoice;
      determining a particular estimated payment delinquency for the particular invoice based at least on the first estimated payment delinquency and the second estimated payment delinquency;
      determining a modified payment reminder schedule for the particular invoice based on the particular estimated payment delinquency for the particular invoice; and
      programming an application to transmit a first set of reminders for the particular invoice based on the modified payment reminder schedule.

7. The medium of claim 1, wherein the operations further comprise:
   determining a particular estimated payment delinquency for a particular invoice of the first subset of the set of target invoices;
   causing transmission of at least one of an email and an alert according to a payment reminder schedule determined for the particular invoice based on the particular estimated payment delinquency.

8. A non-transitory computer readable medium comprising instructions which, when executed by one or more hardware processors, cause performance of operations comprising:
   identifying a training set of invoices, for training a delinquency estimation model ensemble, wherein the training set of invoices is associated with a set of one or more invoice characteristics;
   generating the delinquency estimation model ensemble using machine learning, wherein generating the delinquency estimation model ensemble comprises:
      generating a first delinquency estimation model based on a first subset of the training set of invoices, wherein the first delinquency estimation model determines a first estimated payment delinquency for a particular invoice using a first subset of the set of invoice characteristics;
      generating a second delinquency estimation model based on a second subset of the training set of invoices, wherein the second delinquency estimation model determines a second estimated payment delinquency for the particular invoice using a second subset of the set of invoice characteristics, and the first subset of the set of invoice characteristics and the second subset of the set of invoice characteristics are different;
      forming the delinquency estimation model ensemble using at least the first delinquency estimation model and the second delinquency estimation model;
   applying the delinquency estimation model ensemble to a first target invoice, wherein applying the delinquency estimation model ensemble to the first target invoice comprises:
      applying the first delinquency estimation model to values for the first subset of the set of invoice characteristics for a first target invoice to estimate a first estimated payment delinquency for the first target invoice;
      applying the second delinquency estimation model to values for the second subset of the set of invoice characteristics for the first target invoice to estimate a second estimated payment delinquency for the first target invoice;

determining a first refined estimated payment delinquency for the first target invoice based at least on the first estimated payment delinquency and the second estimated payment delinquency;

applying the delinquency estimation model ensemble to a second target invoice, wherein applying the delinquency estimation model ensemble to the second target invoice comprises:

applying the first delinquency estimation model to values for the first subset of the set of invoice characteristics for a second target invoice to estimate a third estimated payment delinquency for the second target invoice;

applying the second delinquency estimation model to values for the second subset of the set of invoice characteristics for the second target invoice to estimate a fourth estimated payment delinquency for the second target invoice;

determining a second refined estimated payment delinquency for the second target invoice based at least on the third estimated payment delinquency and the fourth estimated payment delinquency;

responsive to determining that the first refined estimated payment delinquency for the first target invoice is above a threshold value: selecting a first schedule of a plurality of schedules;

programming an application to transmit a first set of reminders for the first target invoice according to the first schedule;

responsive to determining that the second refined estimated payment delinquency for the second target invoice is below the threshold value: selecting a second schedule of the plurality of schedules;

programming the application to transmit a second set of reminders for the second target invoice according to the second schedule.

9. The medium of claim 8, wherein selecting the second schedule comprises: de-associating the second target invoice from a default schedule and associating the second target invoice with the second schedule.

10. The medium of claim 8, wherein the application performs one or more of: transmitting an email according to the first schedule, and making an automated telephone call according to the first schedule.

11. The medium of claim 8, wherein the application causes a customer application to present a reminder to a customer according to the first schedule.

12. The medium of claim 8, wherein the application generates an alert to a user to perform a particular collection action according to the first schedule.

13. The medium of claim 8, wherein programming the application comprises modifying code of the application.

14. The medium of claim 8, wherein the operations further comprise:

causing the application to perform one or more of:
transmitting an email according to the first schedule; and
making an automated telephone call according to the first schedule.

15. A non-transitory computer readable medium comprising instructions which, when executed by one or more hardware processors, cause performance of operations comprising:

identifying a training set of invoices, for training a delinquency estimation model ensemble, wherein the training set of invoices is associated with a set of one or more invoice characteristics;

generating the delinquency estimation model ensemble using machine learning, wherein generating the delinquency estimation model ensemble comprises:

generating a first delinquency estimation model based on a first subset of the training set of invoices, wherein the first delinquency estimation model determines a first estimated payment delinquency for a particular invoice using a first subset of the set of invoice characteristics;

generating a second delinquency estimation model based on the second subset of the training set of invoices, wherein the second delinquency estimation model determines a second estimated payment delinquency for the particular invoice using a second subset of the set of invoice characteristics, and the first subset of the set of invoice characteristics and the second subset of the set of invoice characteristics are different;

forming the delinquency estimation model ensemble using at least the first delinquency estimation model and the second delinquency estimation model;

applying the delinquency estimation model ensemble to a target set of invoices, wherein applying the delinquency estimation model ensemble to the target set of invoices comprises;

applying the first delinquency estimation model to values for the first subset of the set of invoice characteristics for the target set of invoices to estimate a first set of respective estimated payment delinquencies for the target set of invoices;

applying the second delinquency estimation model to values for the second subset of the set of invoice characteristics for the target set of invoices to estimate a second set of respective estimated payment delinquencies for the target set of invoices;

determining a set of respective refined estimated payment delinquencies for the target set invoices based at least on the first set of respective estimated payment delinquencies and the second set of respective estimated payment delinquencies;

identifying a subset of the target set of invoices that is associated with respective refined estimated payment delinquencies that are above a threshold value;

presenting, at a user interface, information associated with the subset of the target set of invoices.

16. The medium of claim 15, wherein presenting, at the user interface, the information associated with the subset of the target set of invoices comprises:

generating a graph that displays "age of invoice" on a first dimension and "amount due on invoice" on a second dimension;

plotting the subset of the target set of invoices on the graph.

17. The medium of claim 15, wherein presenting, at the user interface, the information associated with the subset of the target set of invoices comprises:

determining a first number of invoices, of the subset of the target set of invoices, that are associated with a first customer;

determining a second number of invoices, of the subset of the target set of invoices, that are associated with a second customer generating a graph that indicates the first number of invoices associated with the first customer and the second number of invoices associated with the second customer.

18. The medium of claim 15, wherein presenting, at the user interface, the information associated with the subset of the target set of invoices comprises:
   determining a ranking of the subset of the target set of invoices based on the set of respective refined estimated payment delinquencies;
   ordering, at the user interface, the subset of the target set of invoices based on the ranking.

19. The medium of claim 15, wherein the set of invoice characteristics comprises whether a payment reminder schedule has been modified based on an estimated payment delinquency.

20. The medium of claim 15, wherein the operations further comprise:
   modifying a payment term for an invoice of the subset of the target set of invoices.

21. The medium of claim 15, wherein the operations further comprise:
   causing transmission of at least one of an email and an alert according to respective payment reminder schedules determined for the subset of the target set of invoices based on the respective refined estimated payment delinquencies.

* * * * *